United States Patent [19]
Doman

[11] Patent Number: 6,131,486
[45] Date of Patent: Oct. 17, 2000

[54] FLEXIBLE PLATE AND A FLYWHEEL ASSEMBLY EMPLOYING THE FLEXIBLE PLATE

[75] Inventor: Yasunori Doman, Neyagawa, Japan

[73] Assignee: Exedy Corporation, Osaka, Japan

[21] Appl. No.: 09/363,641

[22] Filed: Jul. 30, 1999

Related U.S. Application Data

[63] Continuation of application No. 08/923,292, Sep. 4, 1997, Pat. No. 5,979,594.

[30] Foreign Application Priority Data

Sep. 4, 1996 [JP] Japan ..................................... 8-233993

[51] Int. Cl.$^7$ .............................. G05G 1/00; F16F 15/10
[52] U.S. Cl. ................................ 74/572; 74/574; 464/68; 192/200; 192/70.16
[58] Field of Search ....................... 74/572–574; 464/68; 192/200, 70.16; D15/148; 29/434, 407.08

[56] References Cited

U.S. PATENT DOCUMENTS

| | | | |
|---|---|---|---|
| D. 402,995 | 12/1998 | Hakamata | ............................. D15/148 |
| 4,871,342 | 10/1989 | Boss et al. | .................................. 464/98 |
| 5,191,810 | 3/1993 | Craft et al. | ................................. 74/572 |
| 5,323,665 | 6/1994 | Rediker | ..................................... 74/574 |
| 5,465,635 | 11/1995 | Kono et al. | . |
| 5,515,745 | 5/1996 | Tsuruta et al. | . |
| 5,575,183 | 11/1996 | Schierling et al. | ........................ 74/574 |

FOREIGN PATENT DOCUMENTS

| | | | |
|---|---|---|---|
| 0140576 | 5/1985 | European Pat. Off. | .................. 74/572 |
| 0717211 A1 | 5/1985 | European Pat. Off. | .................. 74/572 |

OTHER PUBLICATIONS

Patent Abstracts of Japan, Pub. No. 55142147, pub. date Jun. 11, 1980.

*Primary Examiner*—Vinh T. Luong
*Attorney, Agent, or Firm*—Shinjyu Global IP Counselors, LLP

[57] ABSTRACT

A flexible plate is formed with a first rigidity about a first axis and a second rigidity about a second axis where the first and second axis are each perpendicular to a central axia about which the flexible plate is rotatable. The first rigidity is greater than the second rigidity such that the flexible plate may flex more easily about the second axis than the first axis, thus providing the flexible plate with an anisotropic flexural rigidity. In one embodiment, the flexible plate is formed with an eliptical intermediate portion. In another embodiment, the flexible plate includes first and second plates. Each plate has a central portion. The first plate has first foot portions and the second plate has second foot portions. The first and second foot portions have differing circumferential widths.

7 Claims, 5 Drawing Sheets

FLEXIBLE PLATE AND A FLYWHEEL ASSEMBLY EMPLOYING THE FLEXIBLE PLATE

This is a Continuation of Application Ser. No. 08/923,292, filed Sep. 4, 1997, which issued as U.S. Pat. No. 5,979,594.

DETAILED DESCRIPTION OF THE PRESENT INVENTION

A. Field of the Invention

The present invention relates to a flywheel assembly and a flexible plate of the flywheel assembly.

B. Description of the Prior Art

When the combustion in an engine is converted to torque via a crankshaft, the crankshaft experiences a flexural vibration. The flexural vibration is transmitted to a flywheel assembly installed in the end of the crankshaft, leading to a flexural vibration of the flywheel assembly. Furthermore, a corresponding reaction force may cause a vibration in the body of a car via an engine block and an engine mount, making a noise during acceleration and during other operating conditions.

It is necessary to reduce a vibration of a flywheel assembly in order to decrease such a noise during acceleration. For that purpose, a flexible plate has been placed between a flywheel and the crankshaft. An inner circumference of flexible plate is typically attached to the crankshaft. An outer circumferential portion of the flexible plate is typically fixed to the flywheel. The flexible plate is generally rigid in a circular or circumferential direction but is relatively flexible (low rigidity) in axial directions such that flexural vibration from the crankshaft may be absorbed as a result of the axial flexibility. Since the flexible plate absorbs a flexural vibration of a crankshaft, the vibration of a flywheel is reduced and noises generated during acceleration are decreased.

A flexible plate having a low rigidity in axial directions absorb a flexural vibration more effectively. However, when used with a manual transmission and a clutch mechanism, if the rigidity of the flexible plate is too low, the flywheel tends to move in an axial direction when releasing the clutch, leading to an ineffective and inefficient disengagement of the clutch.

SUMMARY OF THE INVENTION

One object of the present invention is to provide a flexible plate that is able to absorb a flexural vibration from a crankshaft and therefore reduce noises generated during acceleration but has sufficient rigidity in axial directions to enable reliable disengagement of the clutch.

In accordance with one aspect of the present invention, a flexible plate has an anisotropic flexural rigidity and includes a flywheel installation portion on which a flywheel is installable. The flexible plate also includes a central portion integrally formed with at least a portion of the flywheel installation portion. The central portion is configured for installation on a crankshaft of an engine. The crankshaft and central portion define a center axis about which the flexible plate and the crankshaft are rotatable. An intermediate portion is formed between the flywheel installation portion and the central portion. First and second axes are defined extending through the flywheel installation portion and perpendicular to the center axis. The intermediate portion and the central portion are formed such that flexural rigidity about the first axis is greater than flexural rigidity about the second axis.

Preferably, the central portion is axially offset from the flywheel installation portion by the intermediate portion.

Preferably, the flywheel installation portion is formed with a plurality of holes formed at predetermined intervals in a circumferential direction to reduce a flexural rigidity about the second axis.

Preferably, the intermediate portion has an elliptical shape.

Preferably, the first and second axes are perpendicular to each other.

Alternatively, the flexible plate also includes a first plate and a second plate. Each of the first and second plate are formed with separate annular central portions fixed to one another to define the central portion. The first plate is formed with first foot portions extending in opposite radial directions outward from the annular central portion of the first plate. The second plate is formed with second foot portions extending in opposite radial directions outward from the annular central portion of the second plate. The first foot portions and the second foot portions define the intermediate portion and the flywheel installation portion. The first foot portions and the second foot portions are perpendicular to one another with respect to the central axis. The first foot portions is generally aligned with the first axis and the second foot portions is generally aligned with the second axis. A circumferential width of the second foot portions is greater that a circumferential width of the first foot portions.

Preferably, the first foot portions are symmetrical about the first axis, and the second foot portions are symmetrical about the second axis.

Preferably, an axial thickness of the first plate differs from an axial thickness of the second plate.

In accordance with another aspect of the present invention, a flexible plate has an anisotropic flexural rigidity and includes a flywheel installation portion on which a flywheel is installable and a central portion integrally formed with at least a portion of the flywheel installation portion. The central portion is configured for installation on a crankshaft an engine. The crankshaft and central portion define a center axis about which the flexible plate and the crankshaft are rotatable. An elliptically shaped intermediate portion is formed between the flywheel installation portion and the central portion. Generally perpendicular first and second axis are defined extending through and perpendicular to the center axis, and the flywheel installation portion, the intermediate portion and the central portion are formed such that flexural rigidity about the first axes is greater that flexural rigidity about the second axis.

Preferably, the central portion is axially offset from the flywheel installation portion by the intermediate portion.

Preferably, the flywheel installation portion is formed with a plurality of holes formed at predetermined intervals in a circumferential direction to reduce a flexural rigidity about the second axis.

In accordance with another aspect of the present invention, a flexible plate has an anisotropic flexural rigidity and includes a first plate and a second plate. Each of the first and second plates is formed with separate annular central portions fixed to one another. The annular central portion is configured for installation on a crankshaft an engine. The crankshaft and the annular central portions define a center axis about which the first and second plates and the crankshaft are rotatable. The first plate is formed with a first foot portion extending radially outward from the annular central portion of the first plate. The second plate is formed with a second foot portion extending radially outward from the annular central portion of the second plate. The first foot portion extending and the second foot portion are circumferentially offset from one another with respect to the central axis. The first and second portions define a flywheel installation portion on which a flywheel is installable. A first axis is defined by the first foot portion and a second axis is defined by the second foot portion such that flexural rigidity about the first axis is greater than flexural rigidity about the second axis.

Preferably, a circumferential width of the second foot portion is greater than a circumferential width of the first foot portion.

Preferably, the first plate is formed with two of the first foot portions, the first foot portions extending radially outward in opposite directions, and the second plate is formed with two of the second foot portions extending radially outward in opposite directions. The first foot portions are symmetrical with respect to the center axis, and the second foot portions are symmetrical with respect to the center axis.

Preferably, an axial thickness of the first plate differs from an axial thickness of the second plate.

In the flexible plate in accordance with the present invention, flexural vibrations from a crankshaft of an engine are adsorbed within a certain range of frequency and amplitude, due to the flexing ability of the flexible plate about one axis, but limited flexing ability in about another axes, where both axis are perpendicular to a central axis of the flexible plate. Thus, the flexible plate plays a role in preventing transmission of a certain range of flexural vibration from a crankshaft to a flywheel.

The flexural vibration absorbing characteristics of the flexible plate can be manipulated and fine tuned by any of a number of additional features. For example, adding holes to the flexible plate in strategic positions can add more flexibility to those sections of the flexible plate. In the embodiment where two plates are used, the circumferential width of the foot portions can be manipulated to change the characteristics of the flexible plate. Further, in the embodiment where two plates are used, the thickness of each plate can be manipulated to alter the flexural vibration absorbing characteristics. In the embodiment where an intermediate portion has an elliptical shape, the size and depth of the intermediate portion can be manipulated to enhance the flexural vibration absorbing characteristics of the flexible plate. Also, in the embodiment where an intermediate portion has an elliptical shape, the central portion and the flywheel installation portion may be offset axially from one another. The offset dimension may also be manipulated to enhance the flexural vibration absorbing characteristics of the flexible plate.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENTS

First Embodiment

Figure 1:
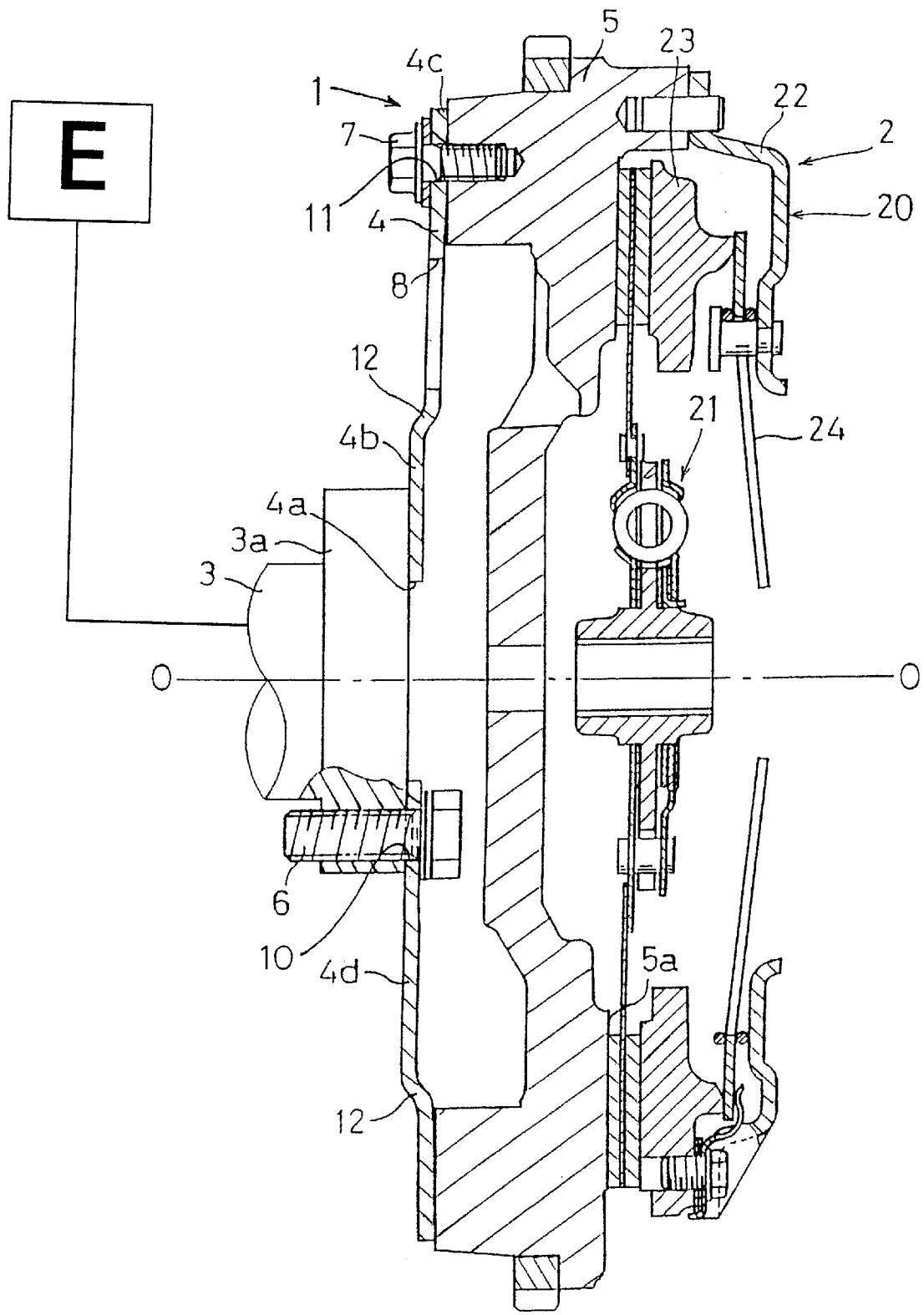
FIG. 1 is a fragmentary, side cross section of a flywheel assembly having a flexible plate in accordance with a first embodiment of the present invention.

FIG. 1 shows a flywheel assembly 1 in accordance with a first embodiment of the present invention and a clutch device 2 which is attached to the flywheel assembly 1. In FIG. 1, the line 0—0 represents a central axis about which the clutch device and the flywheel assembly are rotatable.

The flywheel assembly 1 is installed on an end portion of a crankshaft 3, and includes a flexible plate 4 and a flywheel 5.

Figure 2:
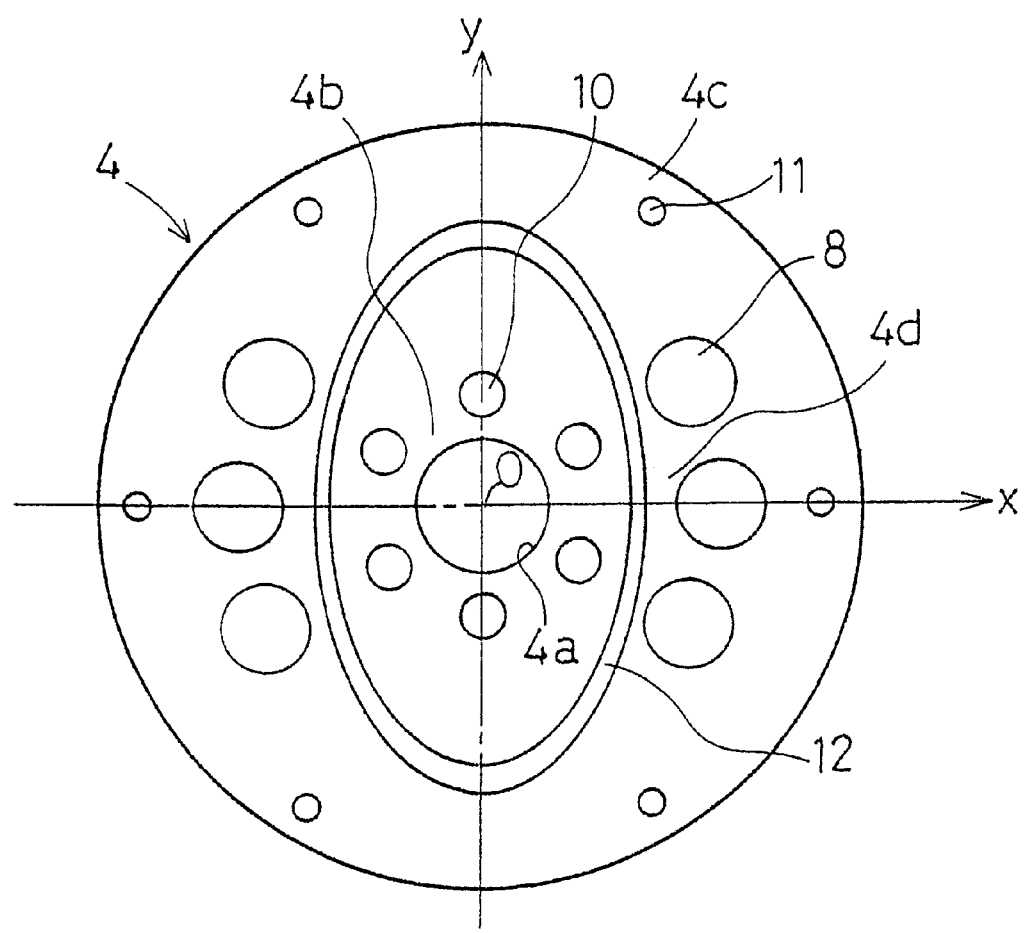
FIG. 2 is an end elevational view of the flexible plate in accordance with the first embodiment of the invention, shown removed from the flywheel assembly depicted in FIG. 1.

The flexible plate 4 has a disk like shape and is formed with a center hole 4a. The flexible plate 4 is generally formed with two portions, an inner circumferential portion 4b and an outer circumferential portion 4c. The inner circumferential portion 4b of the flexible plate 4 is fixed to a flange part 3a of the crankshaft 3 by bolts 6. The bolts 6 passes through holes 10 which are formed in the inner circumferential portion 4b. The flywheel 5 is fixed to the outer circumferential portion 4c by bolts 7. The bolts 7 pass through holes 11 which are formed in the outer circumferential portion 4c. A plurality of pierced holes 8 are formed in the intermediate portion 4d between the inner and outer circumferential parts 4b and 4c. The plurality of pierced holes 8 are located at predetermined intervals in a circular direction as shown in FIG. 2.

An elliptical drawn portion 12 is formed between the inner circumferential portion 4b and the outer circumferential portion 4c of the flexible plate 4. The elliptical drawn portion 12 provides a transition between the inner circumferential portion 4b and the outer circumferential portion 4c in the axial direction, as shown in FIG. 1. Specifically, the inner circumferential portion 4b is axially offset from the outer circumferential portion 4c.

The flexible plate 4 has a flexural and translational rigidities both of which are reduced by the presence of pierced holes 8. Since pierced holes 8 are located at offset intervals, as shown in FIG. 2, the flexible plate 4 has an anisotropic flexural rigidity. The presence of the elliptical drawn portion 12 increases a flexural rigidity with respect to deflection about the x-axis without substantially increasing a flexural rigidity with respect to deflection about the y-axis. Therefore, the formations of pierced holes 8 and the elliptical drawn portion 12 reduces a flexural rigidity around y-axis without decreasing translational (rotation) rigidity.

The flywheel 5 has a generally disk like shape and has a friction surface 5a formed thereon, as shown in FIG. 1.

The clutch device 2 includes a clutch cover assembly 20 and a clutch disk assembly 21 which is disposed between the clutch cover assembly 20 and the flywheel 5. The clutch cover assembly 20 includes a clutch cover 22 which is fixed to the outer circumferential part of the flywheel 5, a pressure plate 23 which urges the clutch disk assembly 21 against the friction surface 5a of the flywheel 5, and a diaphragm spring 24 which biases the pressure plate 23 against the flywheel 5.

The operation of the present invention is as follows.

When the combustion of the engine E is converted to torque via the crankshaft 3, the crankshaft 3 typically experiences a flexural vibration due to the combustion process. Torque and flexural vibration are transmitted to the flexible plate 4 which is fixed to the crankshaft 3. The torque is transmitted to the flywheel 5 which is installed in the outer circumferential portion 4c of the flexible plate 4, then transmitted to the clutch disk assembly 21 which is engaged between the flywheel 5 and the pressure plate 23, and further transmitted to the transmission (not shown) which is connected to the clutch disk assembly 21. On the other hand, the flexural vibrations from the crankshaft 3 are at least partially absorbed by the flywheel 5 because of low rigidity of the flexible plate 4. As the result, the vibration experienced in the body of the car equipped with the present invention is reduced because at least a portion, if not all, of flexural vibration is absorbed by the flexible plate 4 of the flywheel assembly 1, and noises during acceleration are reduced.

In the present embodiment, the flexible plate 4 is designed to absorb flexural vibration that occurs primarily about the y-axis. Therefore, it is preferable to install the flexible plate 4 on the crankshaft 3 so that flexural vibration coincides with or is about the y-axis in FIG. 2. The flexural rigidity of the flexible plate 4 which absorbs a flexural vibration between the crankshaft 3 and the flywheel 5 is the flexural rigidity about the y-axis which is lower than that in other directions. On the other hand, the flexural rigidity about x-axis is relatively high so that there is little flexing of the flexible plate 4 about the x-axis, and hence little vibration absorption about the x-axis. The rigidity about the x-axis also provides an axial rigidity to the flexible plate 4 that limits axial displacement during clutch engagement and disengagement. In other words, the elliptical drawing portion 12 provides the flexible plate 4 with an axial rigidity that limits axial deflection of the flexible plate 4 where axial forces are applied generally along the central axis 0—0 of the flywheel assembly 1. However, when vibrations are applied to the flywheel assembly where the vibrations occur about the y-axis shown in FIG. 2, the flexible plate 4 easily deflects, thus absorbing vibration. About the x-axis, the flexible plate 4 is relatively rigid.

Thus, since the flexible plate 4 has an anisotropic flexural rigidity, the flexural rigidity around y-axis can be reduced, while keeping the whole translational rigidity of the flexible plate 4. Therefore, the flexible plate 4 can absorb more flexural vibration without reducing axial rigidity necessary for disengagement and engagement of the clutch mechanism. In addition, since the translational rigidity and the flexural rigidity around y-axis can be set up independently by adjusting the location and size of pierced holes 8 and the shape and size of the elliptical drawing portion 12, it is possible to separate resonance frequencies (characteristic frequency) of two modes, a translation and a flexure, of a flywheel assembly 1 by optimizing the translational and flexural rigidities. Thus, the damping ability of a flexural vibration of a flywheel assembly 1 is improved.

Second Embodiment

Figure 3:
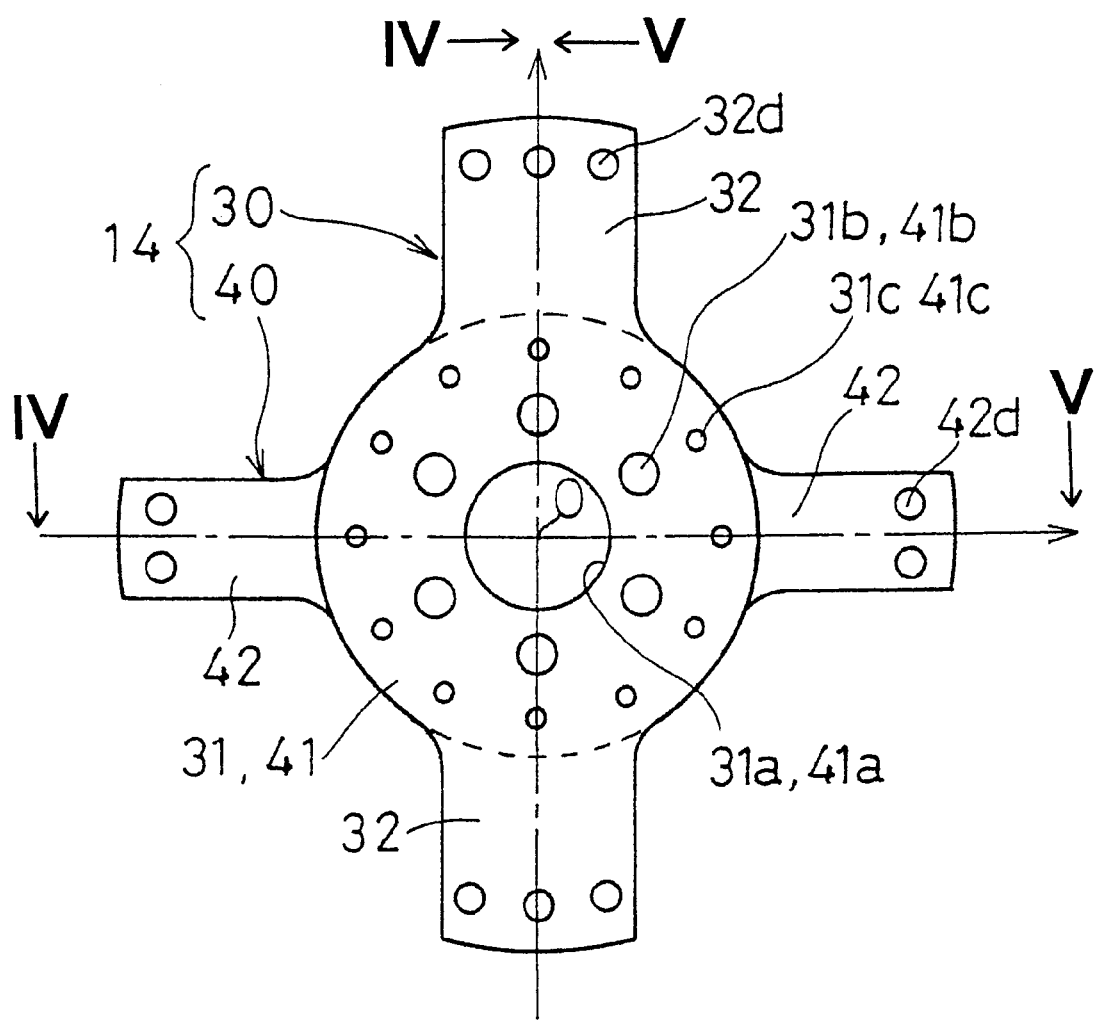
FIG. 3 is an end elevational view similar to FIG. 2, showing a flexible plate in accordance with a second embodiment of the present invention.

While the flexible plate 4 as shown in FIG. 2 is used in the first embodiment, a flexible plate 14 in accordance with a second embodiment may also be employed, as shown in FIG. 3.

The flexible plate 14 is formed from plates 30 and 40 which are fixed by rivets not shown in FIG. 3. Plates 30 and 40 include disk-like central portions 31 and 41, respectively, each having center holes 31a and 41a, respectively. The plates 30 and 40 are further formed with a pair of oppositely extending foot portions 32 and 42, respectively, which extend outward in opposite radial direction from the central portions 31 and 41, respectively. A plurality of holes 31b and 41b are formed in the central portions 31 and 41, respectively. The central portions 31 and 41 may be fixed to the flange portion 3a of the crankshaft 3 by bolts 6 which pass through holes 31b and 41b. Rivets holes 31c and 41c are formed in the outer circumferential parts of the central portions 31 and 41. The plates 30 and 40 are connected to each other by rivets (not shown) which extend through holes 31c and 41c. When the plates 30 and 40 are connected, the angle defined between both foot portions 32 and 42 is 90°. Holes 32d and 42d are formed at outer radial portions of the foot portions 32 and 42, respectively. The flywheel 5 may be attached to the foot portions 32 and 42 by bolts 7 which pass through the holes 32d and 42d.

The foot portions 32 and 42 define a flywheel installation portion in the area around the holes 32d and 42d, respectively. The area between the holes 32d and 42d and the central portions 31 and 41 of the foot portions 32 and 42 define intermediate portions of the flexible plate 14.

The flexible plate 14 has a small flexural rigidity around y-axis, because the width of the foot portion 42 of the plate 40 is small. On the other hand, it has a large flexural rigidity around x-axis, since the width of the foot portion 32 of the plate 30 is large. Thus, while the whole translational rigidity (rotational rigidity) of the flexible plate 14 is generally large, the flexural rigidity around y-axis is set up to be so small that the flexible plate 14 adsorbs at least a portion of flexural vibration.

The flexible plate 14 in the present embodiment has an anisotropic flexural rigidity and can absorb a flexural vibrations without losing the axial rigidity necessary for continuous engagement and disengagement of the clutch mechanism. By separating positively resonance frequencies (characteristic frequency) of two modes, translation and flexure, of a flywheel assembly 1, the damping ability of a flexural vibration of a flywheel assembly 1 is improved.

In the flexible plate 14, the plate 30 (in combination with the plate 40) provides an axial rigidity able to withstand engagement and disengagement of the clutch mechanism. The plate 40 having smaller foot portions 42 than the foot portions 32 of the plate 30, enables the flexible plate 14 to undergo greater flexing about the y-axis than the x-axis. Further the two plates 30 and 40 provide circumferential rigidity insuring efficient transmission of torque.

In the present embodiment, the central portions 31 and 41 of the flexible plate 14 are fixed to the crankshaft 3. The central portions 31 and 41 are, from a structural point of view, very important because large torque forces are experienced due to the connection between the two plates 30 and 40 and the crankshaft. Therefore, central portions 31 and 41 being fixed to each other provide a large flexural rigidity, leading to a reduction in localized stress. Thus, the flexible plate 14 has an optimized structure in which the part receiving a large amount of torque has a large rigidity without increasing the flexural rigidity of the entire flexible plate.

In the present embodiment, the flexible plate 14 is formed using two plates, each plate having foot portions 32 and 42 extending in opposite directions from the central portions 31 and 41, respectively. It is also possible to form a flexible plate which has more than two plates with foot portions extending from a central portion thereof.

Alternate Embodiment

In the above second embodiment, the flexural rigidities of both plates 30 and 40 differ owing to the different width of foot portions 32 and 42. It is also possible to make difference in the flexural rigidity owing to the different thickness of a plate or the presence of holes, instead of the different width of foot portions.

Figure 4:
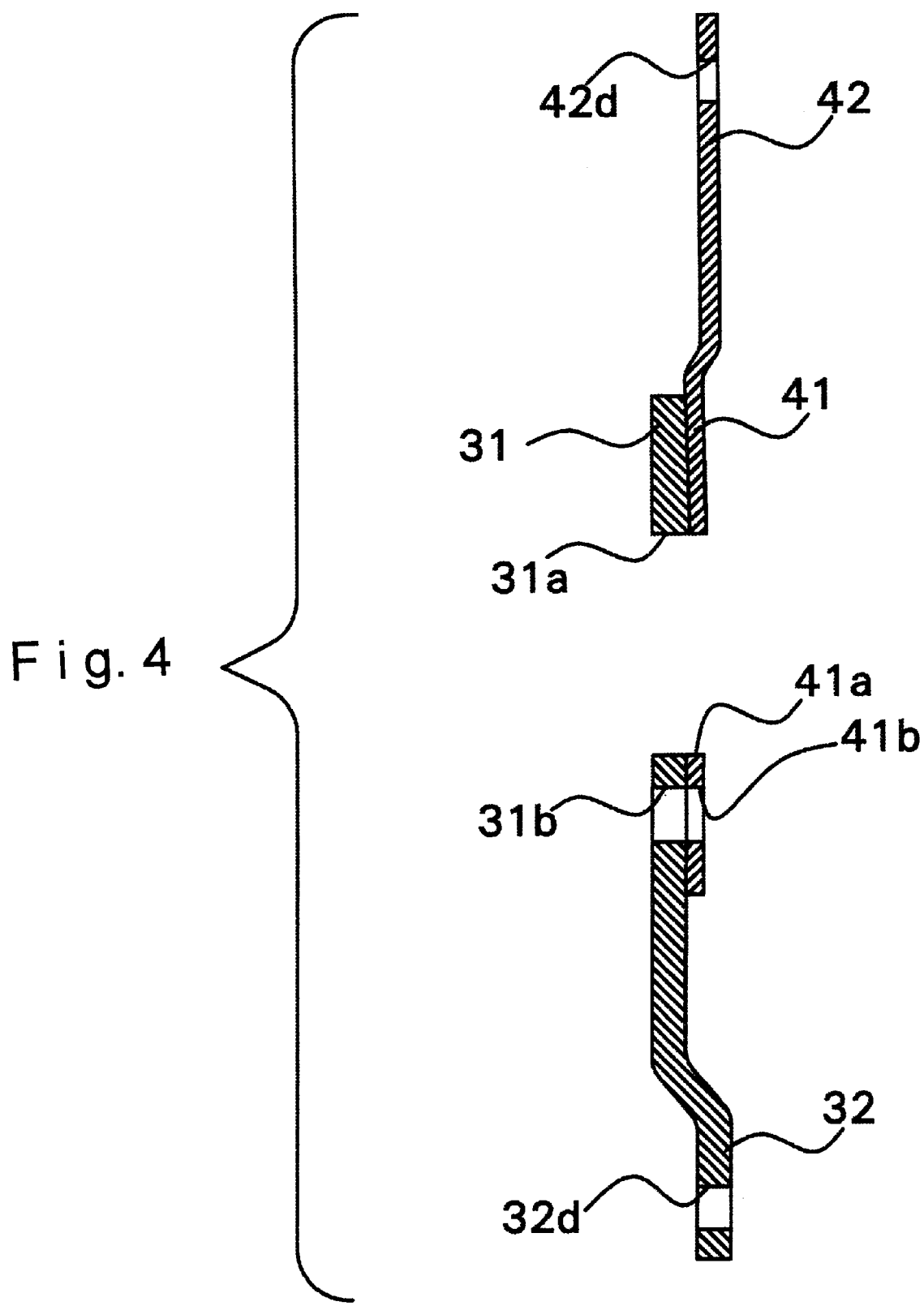
FIG. 4 is a cross sectional view of the flexible plate shown in FIG. 3, viewed in the direction of IV—IV, wherein the foot portion 32 is thicker than the foot portion 42.
Figure 5:
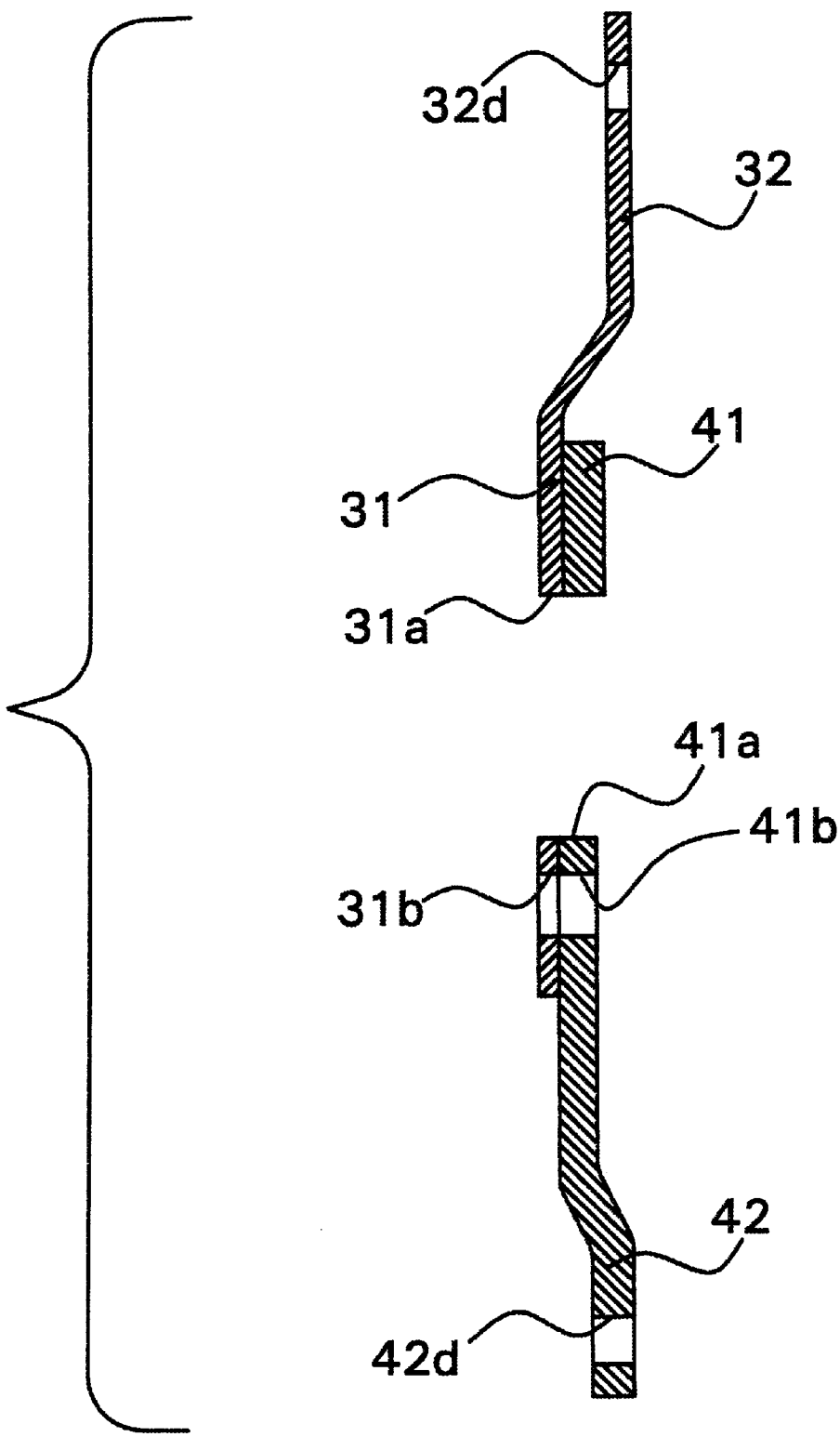
FIG. 5 is a cross sectional view of the flexible plate shown in FIG. 3, viewed in the direction of V—V, wherein the foot portion 42 is thicker than the foot portion 32.

FIGS. 4 and 5 are only to illustrate possible relationships between thickness of the foot portions 32 and 42, and not to show actual dimensions of the foot portions 32 and 42.

In the above first and second embodiments, a flywheel assembly 1 does not have a dampening mechanism to damp a torsional vibration which is caused by a crankshaft 3. It is also possible to apply a flexible plate of the present invention to a separated type of flywheel which has a dampening mechanism between divided flywheels.

The Effect of The Invention

Since the flexible plate of the present invention has an anisotropic flexural rigidity, it is possible to reduce a flexural rigidity in a certain direction without changing a translational rigidity. Therefore, without losing the sharpness of the disengagement of the clutch, the flexible plate can absorb more flexural vibration of a crankshaft and reduce noise during acceleration than prior art flexible plates.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A flexible plate which has an anisotropic flexural rigidity, said flexible plate being adapted to be installed on a crankshaft of an engine, a flywheel being adapted to be installed on said flexible plate, said flexible plate comprising:

a flywheel installation portion on which the flywheel is adapted to be installed;

a central portion integrally formed with at least a portion of said flywheel installation portion, said central portion being adapted to be installed on the crankshaft of the engine, the crankshaft and said central portion defining a center axis about which said flexible plate and the crankshaft are adapted to rotate;

an intermediate portion formed between said flywheel installation portion and said central portion;

a first plate and a second plate, each of said first and second plates formed with separate annular central portions fixed to one another to define said central portion;

said first plate formed with first foot portions extending in opposite radial directions outward from said annular central portion of said first plate;

said second plate formed with second foot portions extending in opposite radial directions outward from said annular central portion of said second plate;

said first foot portions and said second foot portions defining said intermediate portion and said flywheel installation portion;

first and second axes being defined extending through said flywheel installation portion and perpendicular to the center axis, said intermediate portion and said central portion being formed such that flexural rigidity about said first axis is greater than flexural rigidity about said second axis, said first foot portions and said second foot portions being perpendicular to one another with respect to the central axis, said first foot portions being generally aligned with said first axis and said second foot portions being generally aligned with said second axis; and wherein a circumferential width of said second foot portions is greater that a circumferential width of said first foot portions.

2. The flexible plate as set forth in claim 1, wherein said first foot portions are symmetrical about said first axis, and said second foot portions are symmetrical about said second axis.

3. The flexible plate as set forth in claim 1, wherein an axial thickness of said first plate differs from an axial thickness of said second plate.

4. A flexible plate which has an anisotropic flexural rigidity, said flexible plate being adapted to be installed on a crankshaft of an engine, a flywheel being adapted to be installed on said flexible plate, said flexible plate comprising:

a first plate and a second plate, each of said first and second plates formed with separate annular central portions fixed to one another, said annular central portion being adapted to be installed on the crankshaft of the engine, the crankshaft and said annular central portions defining a center axis about which said first and second plates and the crankshaft are adapted to rotate;

said first plate formed with a first foot portion extending radially outward from said annular central portion of said first plate;

said second plate formed with a second foot portion extending radially outward from said annular central portion of said second plate;

said first foot portion and said second foot portion being circumferentially offset from one another with respect to the central axis, said first and second portions defining a flywheel installation portion on which the flywheel is adapted to be installed; and a first axis being defined by said first foot portion and a second axis being defined by said second foot portion such that flexural rigidity about said first axis is greater than flexural rigidity about said second axis.

5. The flexible plate as set forth in claim 4, wherein a circumferential width of said second foot portion is greater that a circumferential width of said first foot portion.

6. The flexible plate as set forth in claim 5, wherein said first plate is formed with two of said first foot portions, said first foot portions extending radially outward in opposite directions, and said second plate is formed with two of said second foot portions extending radially outward in opposite directions, said first foot portions being symmetrical with respect to the center axis, and said second foot portions being symmetrical with respect to the center axis.

7. The flexible plate as set forth in claim 4, wherein an axial thickness of said first plate differs from an axial thickness of said second plate.

* * * * *